United States Patent Office 3,541,429
Patented Nov. 17, 1970

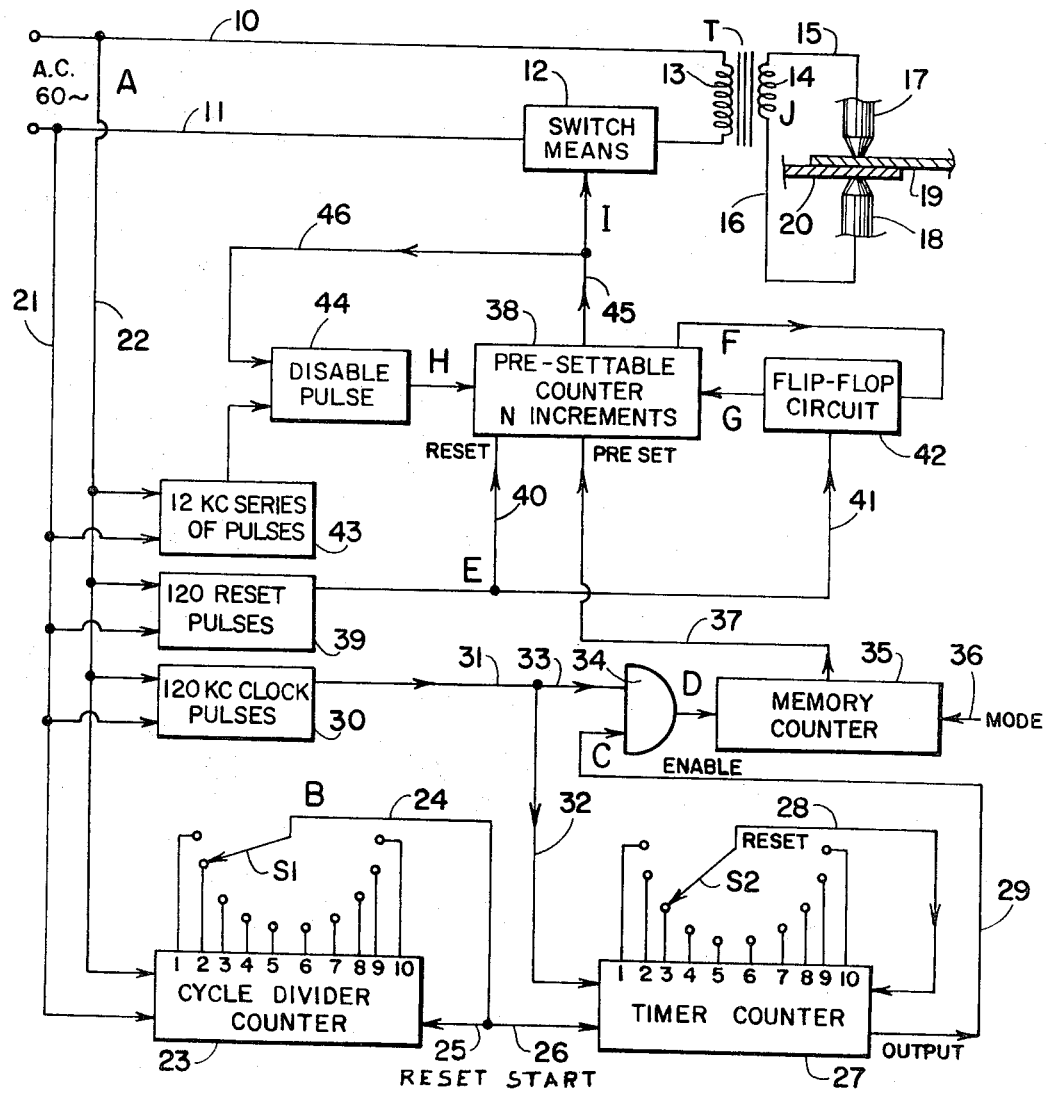

3,541,429
VARIABLE DIGITAL WAVE FORM DIVISION FOR POWER CONTROL
Ricky Martin, North Hollywood, Calif., assignor to Harry Feick Co., Inc., a corporation of California
Filed Jan. 30, 1969, Ser. No. 795,262
Int. Cl. G05f 3/04
U.S. Cl. 323—16
7 Claims

ABSTRACT OF THE DISCLOSURE

An electrical circuit controls the power delivered to a load from a cyclic wave form by digital division of the wave form. A series of pulses of considerably higher frequency than the frequency of the wave form is passed into a pre-settable counter. Initiation of operation of the pre-settable counter is effected in synchronism with a consistent phase angle of the sine wave and a control pulse is derived from the pre-settable counter after a preselected number of pulses have been counted. A cycle selecting means in the form of a divider counter cooperates with a pre-settable control means to provide a given pre-setting number of pulses during each of preselected given cycles to the pre-settable counter in a manner to pre-set the pre-settable counter at successive higher or lower numerical values so that the preselected number of pulses counted varies in an up or down direction. The control pulse generated at the completion of the various preselected number of pulses counted operates a switch connected between the wave form and load to pass successively increasing or decreasing fractions of the wave form to the load, the particular fraction being a function of the actual preselected number of pulses counted. The power delivered to the load may thus be digitally varied at a rate determined by the preselected given cycles and the given pre-setting number of pulses.

---

This invention relates broadly to electrical control circuits and more particularly, to an improved circuit enabling automatic variable divisions of a wave form in a desired manner for controlling power delivered to a load during a given period.

While the circuit of this invention will have many applications, its preferred embodiment will be described in conjunction with the controlling of power or current delivered to the electrodes of a welding machine.

BACKGROUND OF THE INVENTION

Most commercially electrically operated welding machines are automated to the extent that various operations carried on for given lengths of time successively follow one another all in accordance with a prearranged program. For example, one operation would be the application of a given current to the electrodes for a programmed length of time in order to effect an optimum weld. In this situation as well as others, there is involved supplying of a given load with electrical power at a given rate over a given period of time.

With respect to the specific application of supplying current to welding electrodes, once a particular programmed length of time has been selected for applying the welding current, it is extremely important that the particular current applied be controlled. In some instances, depending upon the particular materials to be welded, it is desirable that the particular current have a constant value. In other instances, it is desirable that the current gradually increase during the welding period. In still other instances, it might be desirable that the welding current decrease at a given rate during the welding period. Thus, it is found that for certain specific types of materials, a gradual preheating is desired in a programmed manner before maximum heat is applied; that is, before the maximum value of current is passed to the electrodes. The variable power supplied to the electrodes during the given programmed period might thus continuously increase thereby defining a given slope. This slope might in addition change depending upon the particular materials involved so that the rate at which power is supplied is changed.

The value or magnitude of current, of course, can be controlled by simply varying the amplitude of the wave form representing the current. However, this type of control at best is only approximate and is generally of an analog nature such that repeatability of the precise same quantity of current is difficult. As a consequence, consistent welds on given materials cannot always be achieved.

In U.S. patent application Ser. No. 675,385, filed Oct. 16, 1967, now Patent No. 3,452,214 issued June 24, 1969, and entitled Digital Wave Form Division for Power Control, assigned to the same assignee as the present invention, there is disclosed a digital type system for controlling power delivered to a load. The power is derived from a cyclic wave form such as a sine wave and the digital control functions to select a desired fraction of the cyclic wave form, from, for example, each cycle or half cycle of the wave form and apply this to the load. The value of this fraction, assuming other parameters to be constant, will, of course, determine the overall power delivered to the load.

In accord with the invention described in the aforementioned patent application, there is provided a pulse generating means for generating a series of pulses of frequency constituting an integral multiple of the frequency of the cyclic wave form. A counting means in turn is connected to receive these pulses and suitable means are provided for initiating the counting of these pulses at a point in time defined by a consistent phase angle of the cyclic wave form. This phase angle may be defined by the zero coss-over points of the wave form or may constitute a consistent point in time spaced by a preselected phase angle measured from the cross-over points.

Any desired preselected number of pulses to be counted may be established in the counting means. The circuit is such that a control pulse will be generated by the counting means when the counting of the preselected number of pulses has been completed. There is thus defined a time interval between the initiation of the counting means and the completion of the counting of the preselected number of pulses which time intervals may be employed to control a switch means to pass a fraction of each cycle, half cycle, or cycles separated by consistent intervals of the wave form to the load, this fraction being a function of the preselected number of pulses counted. Thus, the power to the load may be very finely varied in digital increments by simply changing the preselected number of pulses to be counted.

The foregoing system provides a very accurate means of assuring that a consistent input power to a load will be supplied and repeatability is assured by simply setting the preselected number of pulses to be counted at the same value. However, there is no means for providing a variable power to the load during the given programmed time period. Thus, if the materials to be welded are of such a nature that a pre-heating is necessary before full power or heat is supplied to the welding electrodes, the manner in which power is supplied should increase at a predetermined rate or slope.

BRIEF DESCRIPTION OF THE PRESENT INVENTION

With the foregoing in mind, it is a primary object of the present invention to provide an improved system for the digital division of a cyclic wave form wherein either a consistent input power over a programmed period may be supplied to a load or a variable power either increasing or decreasing over the programmed period may be supplied all in a completely automatic manner and in such a way that repeatability is assured.

Briefly, this and other objects and advantages are attained by generating a series of pulses as in the aforementioned pending patent application; initiating the counting of a preselected number of such pulses in synchronism with a consitent phase angle of the wave form; generating a control pulse in response to the completion of each counting to define a time interval between the initiating time of the counting and its completion; preselecting given cycles of the wave form; changing the preselected number of the pulses by a given pre-setting number of pulses during each of the given cycles to provide different time intervals during the preselected given cycles; and actuating a switch means at a point in time determined by the time intervals to cause fractions of the wave form to be passed to the load. These fractions are functions of the preselected number of the pulses counted so that the power delivered to the load varies at a rate determined by the preselected given cycles and the given pre-setting number of pulses.

The present invention thus essentially provides a circuit which will automatically change the preselected number of pulses counted in a counter similar to that described in the aforementioned patent application at definite time intervals such as at each cycle, every other cycle, every third cycle, or at any other preselected cycles so that a desired increase or decrease in the power delivered during the programmed time period will result, such increase or decrease being digitally controllable.

BRIEF DESCRIPTION OF THE DRAWINGS

A better understanding of the invention will be had by now referring to the accompanying drawings, in which:

FIG. 1 is a schematic diagram partly in block form illustrating the circuit of this invention;

FIG. 2 is a plot showing the manner in which a variable power may be supplied to a load by the circuit of FIG. 1.

DETAILED DESCRIPTION OF THE PREFERRED EMBODIMENT

Figure 3:
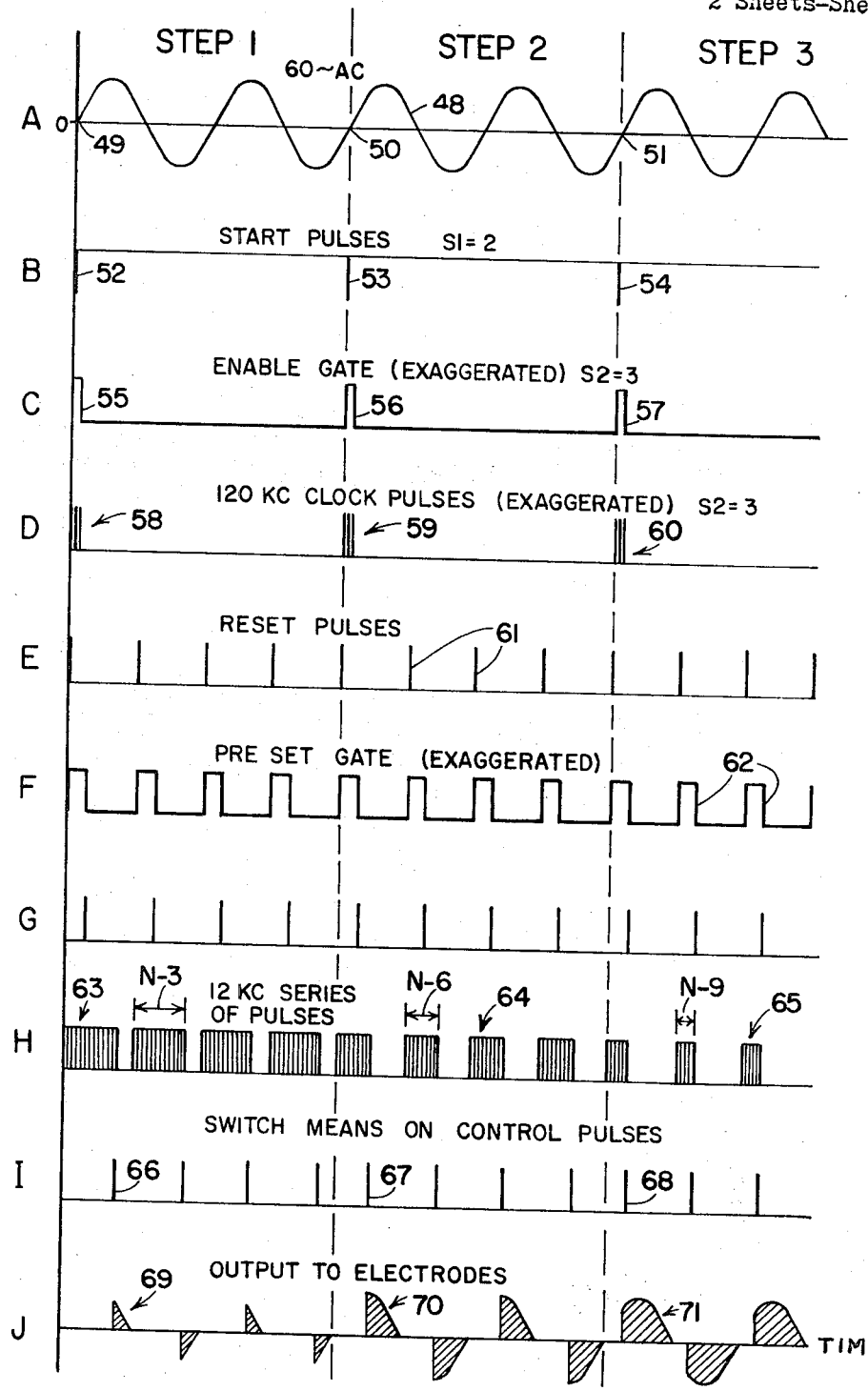
FIG. 3 illustrates a series of wave forms occurring at correspondingly lettered points in the circuit of FIG. 1 useful in explaining the operation of the invention.

Referring to FIG. 1 there is shown, by way of example, conventional A.C. 60-cycle power lines 10 and 11 connecting through a switch means 12 to the primary 13 of a step down transformer T. The secondary 14 of this transformer connects through lines 15 and 16 to welding electrodes 17 and 18 positioned to weld together two overlapping members 19 and 20.

When the switch means 12 is closed, power from the A.C. 60-cycle source will be passed through the transformer to the welding electrodes and will effect a welding of the members 19 and 20. Thus, the power delivered to the electrodes 17 and 18 is derived from a cyclic wave form which, in the persent example, constitutes a 60-cycle sine wave. The invention will hereafter be described in conjunction with a sine wave as providing power to the load in the form of the electrodes 17 and 18. It should be understood however, that the principles of the invention are applicable to any cyclic wave form.

In accordance with the invention, the power passed to the welding electrodes 17 and 18 of FIG. 1 or any other equivalent load is controlled by the switch means 12. This switch means, as one example, may constitute silicon controlled rectifier means responsive to a control pulse to close or assume an "on" state for passing the wave form through the transformer to the load. This type of switch is designed to turn itself off automatically at the zero cross-over point of the sine wave; that is, when a polarity reversal takes place. In this case, it will be evident that the provision of a control pulse at a given point during the cycle of the sine wave coupled with the fact that the switch automatically turns itself off at the zero crossover point enables a desired fraction of the wave form to be passed to the load. By varying the point in time of the control pulse to the switch means to turn the same on relative to the phase of the sine wave form, this fraction may be varied from zero to the full value of the wave form and thus a very accurate degree of the actual power delivered to the load can be realized.

The accurate provision of a control pulse to the switch means at a selected point in time during each cycle of the wave form is achieved by a digital division of the sine wave form. In accord with the heretofore mentioned prior patent application, this digital division is accomplished by generating a series of pulses and initiating the counting of a preselected number of such pulses at a consistent phase angle of the input sine wave. The control pulse is generated upon completion of the count of the preselected number of pulses to thereby close the switch means and pass a fraction of the cyclic wave form to the load. By varying the preselected number of pulses to be counted, the value of the fraction of the wave form is varied and thus there is provided the desired control over the power.

In accord with the present invention, the number of preselected pulses counted is automatically changed to provide a step-wise increase or decrease in the power to the load during the programmed period that energy is to be supplied to the electrodes.

The basic components for carrying out the foregoing will now be described in FIG. 1. As shown, there are provided branch lines 21 and 22 from the power lines 10 and 11. These lines extend down to the lower left portion of the drawing to connect to a cycle selecting means in the form of a cycle divider counter 23. The input to this counter may include suitable differentiating circuits to provide a pulse each time the input sine wave crosses the zero axis in one direction so that the frequency of pulses corresponds to the frequency of the sine wave. In the example set forth, the frequency of these pulses would be 60 per second.

The cycle divider counter 23 includes a simple counter which may be of the ring type with taps numbered 1 through 10. As the generated pulses are counted, successive voltage signals will appear on the respective taps. By positioning the switch S1 on one of the taps such as tap number 2, and connecting this switch arm to a reset circuit in the divider counter 23, it will be evident that the counter will be reset after each second pulse is received. There is thus provided on the line 24 a pulse coresponding to every other input cycle received. If the arm S1 were positioned on the tap 8, there would be provided on the lead 24 a pulse for every 8 cycles received.

The pulses appearing on the line 24 are referred to hereafter as start pulses and it will be evident that the input sine wave frequency is always an integral multiple of the frequency of these start pulses. This integral multiple may be changed from 1 to 10 and is simply selected by positioning of the switch arm S1 on the desired tap.

The start pulses on the line 24 pass through line 26 to the input of a timer counter 27 constituting one component of a pre-settable control means. Timer counter 27 includes a switch arm S2 capable of being positioned on any one of 10 output taps. Whenever a signal appears on the arm S2, it is passed through line 28 to a reset circuit in the timer counter to reset this counter. An enabling gate is taken from an output line 29 from the timer counter. Its purpose will become clearer as the description proceeds.

Also received in the timer counter 27 are generated clock pulses provided by a clock pulse generator 30 which may constitute a high frequency oscillator providing pulses at a substantially higher frequency than that of the input A.C. 60-cycle sine wave. As an example, the clock pulses might be of a frequency of 120 kc. These pulses pass through lines 31 and 32 to the timer counter 27 as shown and are received for counting by the timer counter. The initiation of this counting is effected by the start pulse received by the timer counter on the line 26. When a certain count has been reached determined by the switch arm S2, the signal appearing on the arm S2 will reset the timer counter. For example, in FIG. 1 the arm S2 is illustrated on tap number 3. Therefore, when a start pulse is received at the input 26, the counter will start counting the clock pulses from the clock generator 30 and when the third pulse is counted, a signal will appear on the switch S2 which will reset the timer counter. The timer counter will not start counting the clock pulses again until the next start pulse is received on the line 26.

The output from the clock pulse generator 30 on the line 31 also passes through a line 33 to a coincidence circuit 34. This circuit 34 receives the enabling gate on the line 29 from the timer counter 27. This gate opens the coincidence circuit 34 for a time duration corresponding exactly to the length of time for three pulses from the clock pulse generator 32 to be counted. The generation of this gate may be achieved by a multi-vibrator which initiates generation of a square wave at the time of the start pulse and terminates generation when a signal appears on the switch arm S2.

From the coincidence circuit 34, the gated clock pulses from the clock pulse generator 30 pass to a memory counter 35. This memory counter is capable of counting up or counting down depending upon the desired mode selection indicated at 36. When the mode is in one position, the counter will count up and when in a second position, the counter will count down. The memory counter essentially accumulates the count when in the up mode so that every time a start pulse is received in the timer counter 27, there will be gated three of the clock pulses from the generator 30 to the memory counter, assuming that the switch arm S2 is set on tap number 3 as shown. If the switch arm S2 were set on tap number 7, for example, the memory counter would accumulate 7 pulses each time a start pulse was received in the timer counter 27, the generated gate on lead 29 being of a duration to permit 7 clock pulses to be received in the memory counter.

The memory counter connects through lead 37 to a pre-settable counter 38. This counter is automatically reset to a zero count condition by a resetting pulse provided by a reset pulse generator 39 shown connected to the branch lines 21 and 22. In the particular embodiment described, the reset pulse generator provides a reset pulse at every zero cross-over point of the input sine wave so that 120 reset pulses are provided per second for a 60-cycle input sine wave. A branch lead 40 from the reset pulse generator 39 connects to the reset circuit of the pre-settable counter 38.

The same reset pulses from the reset pulse generator 39 also pass through a lead 41 to a circuit means including a flip-flop circuit 42 cooperating with the pre-settable counter. The purpose for this portion of the circuit will become clearer as the description proceeds.

A third pulse generator is illustrated at 43 and generates a series of pulses at a frequency of, for example, 12 kilocycles. These pulses are utilized for digitally dividing the input sine wave form in order to enable a selected fraction of the input sine waves to be passed to the load. As shown, the output from the pulse generator 43 passes through a disabling pulse circuit 44 to an input of the pre-settable counter 38.

An output line 45 from the pre-settable counter 38 connects to the switch means 12 and serves to pass a control pulse to this switch means to close the switch and permit energy from the A.C. line to pass through the transformer T to the welding electrodes. The control pulse-appearing on the output lead 45 occurs when the pre-settable counter has counted a a preselected number of pulses corresponding, for example, to N increments. Whenever a control pulse appears on the line 45, it is also passed through lead 46 to the disabling pulse circuit 44 and blocks further pulses from the generator 43 to the counter until such time as the counter is reset.

Essentially, initiation of the counting of pulses from the pulse generator 43 by the pre-settable counter is effected by the reset signal from the clock pulse generator 39 and thus the pre-settable counter starts counting anew each half cycle. After a given time determined by the preselected number of pulses to be counted, the control pulse is passed through the line 45 to operate the switch means 12. When a zero cross-over occurs of the input sine wave, as described, the switch means 12 is opened so that only a fraction of the input sine wave is passed to the load.

It will be evident from the foregoing that by changing the preselected number of pulses to be counted by the pre-settable counter, the time at which the switch means is closed can be changed and thus the value of the fraction of the wave form passed to the load can be changed.

The preselected number of pulses to be counted by the pre-settable counter is effectively changed by means of pre-setting the pre-settable counter at a given value at a consistent time from the time counting is initiated. This pre-setting function is carried out by the information stored in the memory counter 35 and passed to the pre-settable counter 38 through the line 37. For example, if the pre-settable counter is set to count ten pulses or increments, and if this pre-settable counter is preset to three, there will only be seven increments to count and thus a time interval corresponding to the length of time to count seven pulses plus a short constant time during which the pre-setting pulses are accumulated will pass before a control pulse is generated on the line 45 to close the switch means 12. If the pre-settable counter has a preset value of six pulses, then there will only remain four pulses to be counted in the time interval before the generation of the control pulse.

By altering the time interval of generation of the control pulse, the time in phase defining the fraction of the sine wave passed to the load is varied to provide variable power to the load.

The foregoing will become clearer by referring to FIG. 2 wherein the stepped plot 47 represents an increasing power to the load over a programmed time period. Thus, considering the specific example set forth, if the switch arm S1 is on the tap 2 and the switch arm S2 is on the tap 3, it will be clear that a start pulse will be provided to the timer counter 27 on the line 26 every other cycle; that is, every two cycles. The number of pulses accumulated in the memory counter 35 in turn will be three pulses every other cycle. Thus the step function or plot 47 represents the accumulated count in the memory counter 35 and it will be evident that the slope of this function can be varied by either varying the position of the switch S1 or the position of the switch S2, or both. For example, if three pulses were accumulated in the memory counter at each cycle rather than every other cycle, the increase in the step function 47 would take place at a more rapid rate. Similarly, if pulses were inserted at each cycle rather than at every other cycle, the slope would be increased.

As the count in the memory counter 35 increases, it will be evident that the preselected number of counts carried out by the pre-settable counter 38 will effectively be decreased since this counter is pre-set by the number of pre-setting pulses in the memory counter at a concise point in time from the time that its count is initiated. Therefore, the switch means will be operated by a control pulse which is generated an incremental amount sooner in time every other cycle so that a progressively increasing fraction of the sine wave will be passed to the load. This increasing fraction will be proportional to the step function 47.

By changing the mode input 36 to memory counter 35, the reception of pulses in the memory counter can cause it to count down so that a progressively decreased number of pre-settable pulses are passed to the pre-settable counter 38 thereby resulting in successive increases in the preselected number of pulses to be counted before the control pulse is generated. This then results in a progressively decreasing fraction of the wave form being passed to the load and thus the rate of power transfer follows a decreasing slope rather than an increasing slope. Again, the value of the decreasing slope may be varied by changing either or both positions of switch arms S1 and S2.

FIG. 3 illustrates various wave forms appearing at corresponding lettered points in the block diagram of FIG. 1 for the specific example set forth and will now be referred to in conjunction with a description of the overall operation of the circuit.

OPERATION

Referring to both FIGS. 1 and 3 together, assume, as noted, that the switch arm S1 is on the tap 2 for the cycle divider counter 23, the switch arm S2 is on tap 3 for the timer counter 27, and the mode selection 36 for the memory counter 35 is in an up condition so that the memory counter adds pulses received as opposed to subtracting pulses received.

The input sine wave passed to the cycle divider counter 23 through the branch leads 21 and 22 is illustrated at A at the top of FIG. 3. While this cyclic wave form is shown as a sine wave, it should be understood that any cyclic wave form could be used. Certain zero crossover points for this wave form are illustrated at 49, 50 and 51.

The pulses appearing on the switch arm S1 in the number 2 position are illustrated in the second wave form B at 52, 53 and 54. These pulses occur at every other cycle or every second complete cycle as a result of the resetting of the counter after a count of 2 cycles, as described heretofore.

Each time a start pulse is received on the input 26 for the timer counter 27, the timer counter will start counting pulses on the input line 32 from the clock pulse generator 30. After three such pulses are counted, the timer counter is reset as also described heretofore, the start signal and the reset signal defining the initiation and termination of the enabling gate. This gate is illustrated at 55, 56 and 57 in wave form C, the widths of the gates being greatly exaggerated. These gates will open the coincidence circuit 34 thereby permitting the passage of only three pulses from the clock pulse generator 30 so that essentially at the time of each start pulse, the memory counter 35 receives a set of three pulses. These sets of three pulses are illustrated at 58, 59 and 60 in wave form D and again the spacing of these pulses is greatly exaggerated for purposes of clarity.

With respect to the foregoing, it should be noted that the clock pulses have a frequency of 120 kc. and thus 10 such pulses would occupy 1/100 of a half cycle of the 60-cycle sine wave shown in the top plot. Thus, if wave forms C and D were plotted to scale, they would simply appear as a thin line in substantial alignment with the start pulses.

From the description thus far, it will be evident that the memory counter 35, when in the up mode, will accumulate a count of three pulses for every other cycle. Thus, the memory counter will store a count of three at the initiation of the first two cycles, six at the initiation of the next two cycles, nine at the initiation of the next two cycles and so forth.

Wave form E in FIG. 3 represents the reset pulses designated 61 from the reset pulse generator 39 passed through the lead 40 to the pre-settable counter 38. As mentioned, these reset pulses 61 pass to the pre-settable counter 38 and cause it to start counting the series of pulses from the 12 kc. generator 43. They also pass to the flip-flop circuit 42 through the lead 41. The flip-flop circuit 42 generates a pre-setting gate indicated at 62 in wave form F of FIG. 3 of precise constant width. This width is greatly exaggerated for purposes of clarity. The restriction on the width is such that it will accommodate a period of time sufficient to permit the memory counter 35 to store the desired pre-setting number of pulses. At the end of this gate, a pre-setting trigger is generated shown in wave form G. This trigger, at the precise moment in time defined by its position, then pre-sets the counter 38 in accord with the total number of pulses stored in the memory counter 35. Thus at a given consistent time defined by the width of the gates F, after the pre-settable counter 38 and flip-flop 42 are reset each half cycle by the reset pulses 61, a pre-set count of three pulses is set into the pre-settable counter. Two cycles later the memory counter will have accumulated six counts and therefore at the termination of the gate after each time a reset pulse is received by the pre-settable counter, the counter is pre-set to six pulses.

The actual preselected number of counts effected by the pre-settable counter 38 for the various selected cycles are indicated in wave form H at 63, 64 and 65. Continuing with the specific example set forth, there will be provided 100 pulses every half cycle from the 12 kilocycle pulse generator 43. Let N equal these 100 pulses. During the first two cycles, the pre-settable counter will be pre-set to the number of three and thus the remaining pulses to be counted will be $N-3$ or 97 pulses each time the counter is pre-set by one of the triggers in wave form G. At the end of the 97 counts, a control pulse will be generated on the output line 45 this same control pulse serving to disable the counting of further pulses from the 12 kc. generator 43. There will thus be a gap in the counting as indicated in wave form H.

During the next two cycles, there will have accumulated six counts in the memory counter 35 and thus the pre-settable counter will be pre-set to the number six so that the preselected number of pulses to be counted will now be $N-6$ or 94 pulses. The control pulse resulting at the end of the count will thus occur slightly sooner in time than was the case during the first two cycles. When the next two cycles are received the accumulated count in the memory counter will be nine pulses so that the preselected number of pulses to be counted by the pre-settable counter will now be $N-9$ or 91 pulses resulting in the generation of a control pulse slightly sooner than took place during the previous two cycles.

As described, the control pulses 66, 67 and 68 serve to close the switch means 12, the switch means automatically opening at the zero cross-over points of the sine wave. As a consequence, fractions of the sine wave only will be passed to the load as shown by wave form J in FIG. 3. These fractions increase three incremental amounts every other cycle.

Essentially, the shaded areas or fractions of the sine waves increase in the manner depicted by the step function 47 of FIG. 2 so that under the conditions of the switch arm S1 being positioned on tap number 2 and the switch arm S2 being positioned on tap number 3, an increasing power to the load will take place during the programmed time period that the welding electrodes are to be energized.

In the event it is desired to provide a decreasing power to the load during the period of welding, the mode of the memory counter 35 is changed to a down position. Under these conditions, the count recorded in the memory counter 35 is simply decreased by an incremental number of pulses depending upon the setting of the switch arm S2. If the switch arms S1 and S2 are set as shown in FIG. 1, then the total count stored in the memory counter will be decreased by three counts every other cycle so that the preselected number of counts actually counted by the pre-settable counter will progressively increase thereby shifting the position of the control pulse to the right to decrease the fraction of the sine wave passed to the load.

From the foregoing description it will thus be evident that the present invention has provided a unique and novel system for enabling very accurate digital control of the supplying of power to a load wherein consistency and repeatability are assured.

What is claimed is:

1. A method of varying the power delivered to a load from a cyclic wave form in a given manner during a given time period, comprising the steps of: generating a series of pulses; initiating the counting of a preselected number of said pulses in synchronism with a consistent phase angle of said wave form; generating a control pulse in response to the completion of each counting to define a time interval between the initiating time of said counting and its completion; reselecting given cycles of said wave form; changing said preselected number of said pulses by a given pre-setting number of pulses during each of said given cycles to provide different time intervals during the preselected given cycles; and actuating a switch means at a point in time determined by the time intervals to cause fractions of said wave form to be passed to said load, said fractions being functions of said preselected number of said pulses counted, whereby the power delivered to said load varies at a rate determined by the preselected given cycles and said given pre-setting number of pulses.

2. The method of claim 1, in which said switch means is responsive to said control pulse to close and responsive to zero cross-over points of said wave form to open, whereby said fractions of said wave form passed to said load are defined between said control pulse and the succeeding zero cross-over point of said wave form.

3. An apparatus for varying the power delivered to a load from a cyclic wave form in a given manner during a given time period, comprising, in combination: pulse generating means for providing a series of pulses; a pre-settable counting means connected to said pulse generating means; means in said counting means for providing a control pulse upon completion of the counting of a preselected number of pulses; means responsive to said cyclic wave form for initiating operation of said pre-settable counting means in synchronism with a consistent phase angle of said wave form whereby a time interval is defined between the initiation of operation of said pre-settable counting means and the provision of said control pulse; cycle selecting means for preselecting given cycles in said wave form; pre-settable control means responsive to said cycle selecting means and connected to said pre-settable counting means for changing said preselected number of pulses by a given pre-setting number of pulses during each of said given cycles to provide different time intervals during said preselected given cycles; and a switch means connected to pass power to said load from said cyclic wave form when closed and to terminate power to said load when opened, said switch means being connected to be operated by said control pulse whereby said switch means is closed and opened at points in time to cause fractions of said wave form to pass to said load, said fractions being functions of the preselected number of pulses so that the power delivered to said load varies at a rate determined by the preselected given cycles and said given presetting number of pulses.

4. An apparatus according to claim 3, in which said switch means is responsive to said control pulse to close and responsive to zero cross-over points of said wave form to open, whereby said fractions of said wave form passed to said load are defined between said control pulse and the succeeding zero cross-over point of said wave form.

5. An apparatus according to claim 3, in which said cycle selecting means includes a cycle divider counter for generating start pulses at said given cycles such that the frequency of said cyclic wave form is an integral multiple of the frequency of said start pulses, said pre-settable control means including: a clock pulse generator for generating clock pulses at a frequency substantially higher than the frequency of said series of pulses; a timer counter connected to said cycle divider counter and to said clock pulse generator for providing a given number of said clock pulses corresponding to said given pre-setting number of pulses each time a start pulse is received; a memory counter connected to said timer counter to receive said given number of clock pulses and accumulatively count said clock pulses; and circuit means incorporated in said pre-settable counting means and connected to said memory circuit for pre-setting said pre-settable counting means to a value corresponding to the accumulated count present in said memory counter, said pre-setting occurring at a precise time after the initiation of operation of said pre-settable counting means so that the number of pulses actually counted by said pre-settable counting means is changed at each of said selected cycles by said given pre-setting number of pulses.

6. An apparatus according to claim 5, in which said precise time is of sufficient duration to permit said memory counter to accumulate said given pre-setting number of pulses.

7. An apparatus according to claim 5, in which said integral multiple of the frequency of said start signals is adjustable from one to at least ten and in which said given number of clock pulses provided each time a start pulse is received is adjustable from one to at least ten.

References Cited

UNITED STATES PATENTS

| | | | |
|---|---|---|---|
| 3,354,377 | 11/1967 | Leeds | 323—22 |
| 3,436,514 | 4/1969 | Broomhall et al. | 307—252 X |
| 3,445,754 | 5/1969 | Broadhead | 323—16 |
| 3,491,283 | 1/1970 | Johnston | 323—22 X |

J D MILLER, Primary Examiner

A. D. PELLINEN, Assistant Examiner

U.S. Cl. X.R.

219—492; 307—133; 323—18, 22